UNITED STATES PATENT OFFICE.

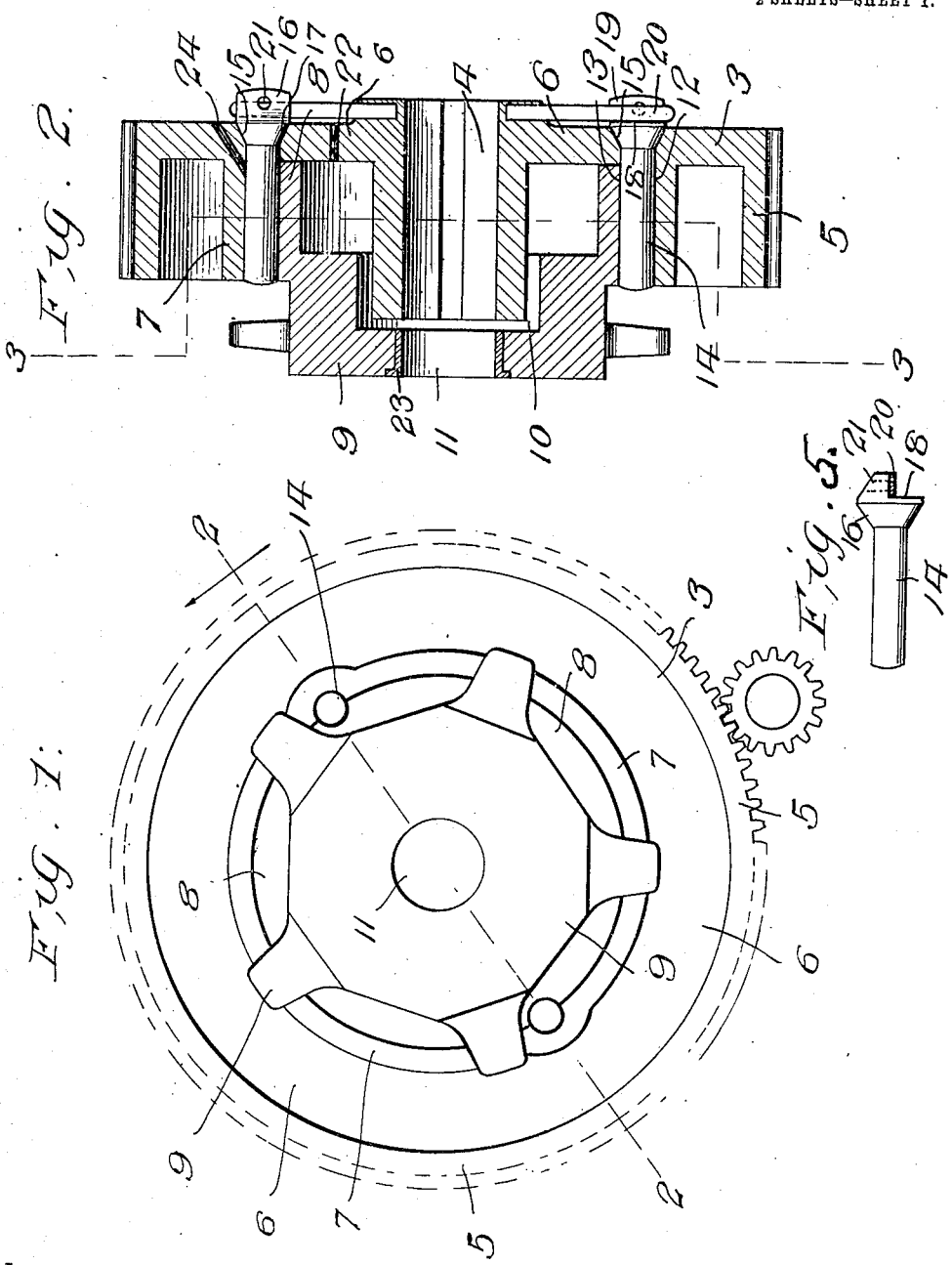

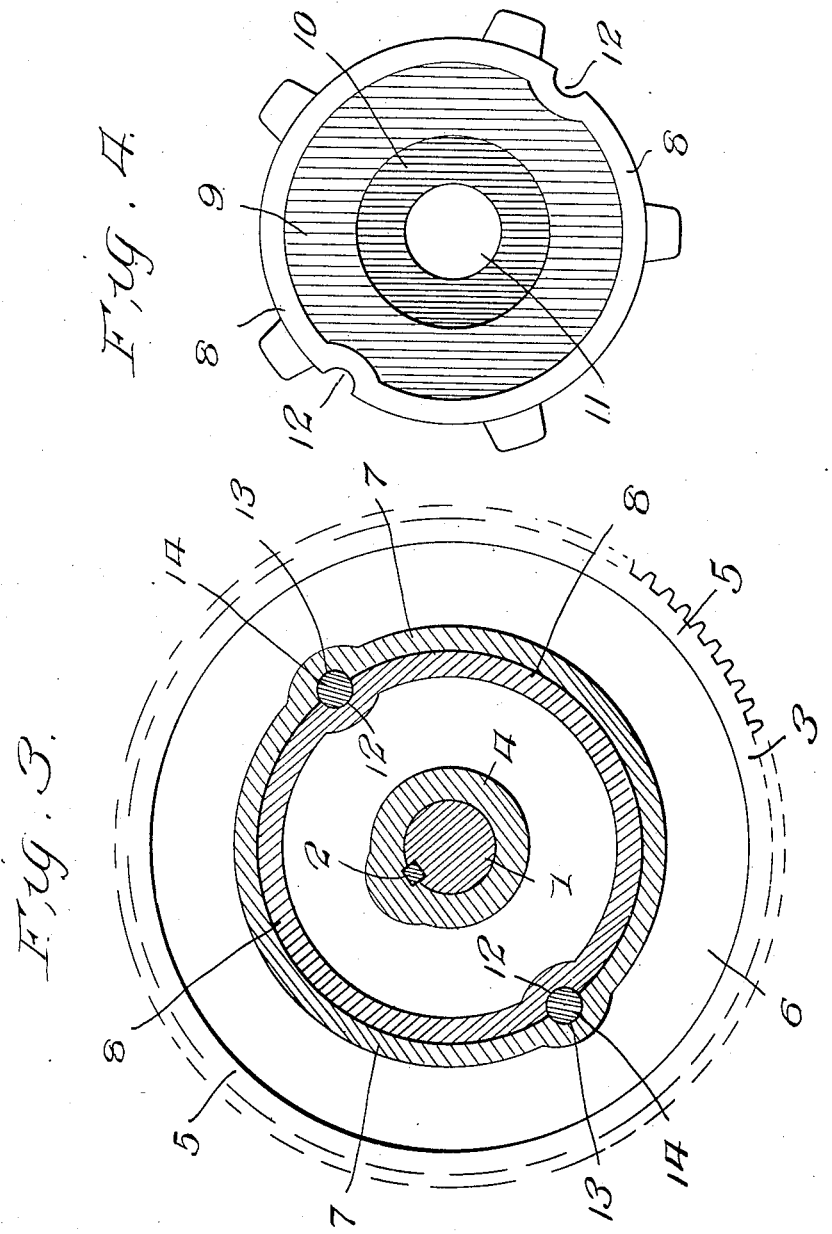

WILLIAM A. BUETTNER AND ARTHUR SHELBURNE, OF SULLIVAN, INDIANA.

DRIVING-GEAR.

No. 892,932.  Specification of Letters Patent.  Patented July 7, 1908.

Application filed March 17, 1908. Serial No. 421,725.

*To all whom it may concern:*

Be it known that we, WILLIAM A. BUETTNER and ARTHUR SHELBURNE, citizens of the United States, residing at Sullivan, in the county of Sullivan and State of Indiana, have invented certain new and useful Improvements in Driving-Gears; and we do hereby declare the following to be a full, clear, and exact description of the invention, such as will enable others skilled in the art to which it appertains to make and use the same.

Our invention relates to new and useful improvements in driving gears and more particularly to that class adapted to be used in connection with chain mining machinery and our object is to provide means for securely locking the coöperating parts of the driving gears together.

A further object is to provide a suitable bearing on one part of the driving gear to receive a coöperating part of the driving gear and a still further object is to provide means for holding the locking devices in position.

Other objects and advantages will be hereinafter referred to and more particularly pointed out in the claims.

In the accompanying drawings which are made a part of this application, Figure 1 is an elevation of the gear ready to be applied to use. Fig. 2 is a sectional view thereof as seen on line 2—2, Fig. 1. Fig. 3 is a sectional view as seen on line 3—3, Fig. 2. Fig. 4 is an elevation of one of the coöperating parts of the driving mechaism, and, Fig. 5 is an elevation of one of the locking pins showing the spring finger for holding the same in position, in section.

Referring to the drawings in which similar reference numerals designate corresponding parts throughout the several views, 1 indicates a shaft, to which is secured in any preferred manner, as by means of a key 2, a driving gear 3, the hub 4 and rim 5 of said driving gear being connected by means of a web 6, said web engaging the hub and rim adjacent one end thereof. Surrounding the hub 4 and substantially midway between the hub and rim 5, is a circular flange 7, said flange being carried by the web 6 and adapted to coöperate with said flange, is a similar flange 8 carried by a driving sprocket 9, the flange 8 extending laterally from one edge of the body of the driving sprocket and is of such diameter as to loosely fit within the flange 7, said flange 7 and base of the web 6 forming a bearing for the flange 8 when the driving sprocket is idle. The inner face of the driving sprocket 9 is formed with a recess 10, into which loosely extends the end of the hub 4, the shaft 1 being extended beyond the end of the hub and through an opening 11 in the center of the driving sprocket, said driving sprocket being rotatably mounted on the shaft and in order to cause the driving sprocket to rotate with the driving gear, the meeting faces of the flanges 7 and 8 are provided at suitable intervals with semicircular alining recesses 12 and 13, respectively, in which are adapted to be seated locking pins 14, said pins being of such diameter as to snugly fit the socket formed by the coöperating recesses 12 and 13. The pins 14 extend through flared openings 15 in the web 6 and are provided at their outer ends with enlarged heads 16, which heads are provided with tapered shoulders 17 to fit the flared openings 15 and in order to prevent the pins from casually leaving their respective recesses, the outer ends of the heads 16 are provided with offsets 18, the axial faces 19 of which form rests for the free ends of spring locking fingers 20, while the opposite ends of said fingers are secured in any preferred manner to the end of the hub 4.

The offsets 18 extend inwardly substantially one-half the width of the heads 16 and it will be readily seen that when the spring fingers are resting against the faces 19, the inner edges of said fingers will rest against the opposite faces of said offsets, thereby securely holding the pins against longitudinal movement, but when it is desired to remove the pins, said pins are given a partial rotation and the locking fingers moved laterally until they are free of the faces of the offsets when said pins can be readily moved from their respective recesses and to facilitate the rotation and removal of the pins, the heads 16 are provided with sockets 21, into which may be introduced any suitable form of implement to rotate said pins, and draw the same outwardly when the locking fingers have been released from the offsets.

The recess 10 is also preferably employed as a lubricant chamber, the lubricant being introduced into the chamber through an oil hole 22 in the web 6 and a sufficient quantity of the lubricant may be placed in the recess 10 to last for a considerable length of time, said lubricant being fed between the shaft 1 and a bushing 23 in the sprocket 9, while the lubricant is introduced between the meeting faces of the flanges 7 and 8 through an oil hole 24 extending through the web 6 and communicating at its inner end with the inner face of the flange 7.

We are aware that it is old to have gears of this class for driving chain mining machinery, but the parts of said gears are so constructed that the strain co-incident to rotating the driving sprocket simultaneously with the driving gear, twists the driving sprocket out of alinement and eventually spreads or breaks the links of the cutting chain and further that the locking pins are forced up from their seats and frequently break the parts of the gear and wedge between the machinery parts. To this end, therefore, we have provided our improved form of gear and it will be readily seen that by providing the coöperating flanges on the driving gear and sprocket, the driving sprocket will be held at all times true and that by entering the locking pins in the recesses as shown and providing the spring-actuated locking fingers, the strain on the driving sprocket will be equally distributed and the locking pins securely held in position. It will likewise be seen that when the driving sprocket is to remain idle and the driving gear rotated independently thereof, the pins 14 may be readily and quickly removed from the recesses by partially rotating the pins to release the spring fingers from the offsets at the ends of the locking pins and when so released, they may be readily lifted out of the recesses and it will be further seen that the pins may be again readily introduced into the recesses by turning the sprocket and gear until the recesses are in alinement with each other when the pins are to be introduced into said recesses and turned to engage the spring fingers with the offsets in the ends thereof.

What we claim is:

1. The combination with a driving gear having a flange; of a sprocket having a flange adapted to be surrounded by the flange on the gear and means to lock said flanges together, whereby the driving sprocket will be rotated simultaneously with the driving gear.

2. The combination with a driving gear having a flange, the inner face of said flange having recesses; of a sprocket having a flange adapted to telescope with the flange on the gear and having recesses in its periphery adapted to coöperate with the recesses in the flange on the gear and means adapted to enter said alining recesses and fix the sprocket with the gear.

3. The combination with a driving gear having a cylindrical flange having recesses in its inner face; of a sprocket having a cylindrical flange adapted to be received by the flange on the gear and having recesses in its outer face, pins adapted to be seated in the coöperating recesses and means to normally hold the pins in the recesses.

4. The combination with a driving gear having a hub, a rim surrounding said hub, a web connecting said rim and hub and a flange carried by said web having semi-circular recesses therein; of a driving sprocket having a flange extending from one edge of said sprocket to telescope with the flange on the web and having semi-circular recesses therein adapted to register with the recesses in the gear flange, pins adapted to enter said recesses and spring-actuated means to hold said pins in the recesses.

5. The combination with a driving gear and a flange carried thereby, the inner face of said flange having recesses; of a sprocket having a flange adapted to be received by the flange on the gear and having recesses in its periphery adapted to coöperate with the recesses in the flange on the gear, pins adapted to be introduced into the openings formed by said recesses, spring-locking fingers secured to the gear and adapted to engage said pins and hold the same against casual removal from the recesses.

6. The combination with a driving gear having a flange; of a sprocket having a flange adapted to be surrounded by the flange on the gear, pins adapted to lock said flanges together, the outer ends of said pins having offsets therein and locking fingers carried by said driving gear adapted to enter said offsets and hold the pins against casual disengagement from said flanges.

In testimony whereof we have signed our names to this specification in the presence of two subscribing witnesses.

WILLIAM A. BUETTNER.
ARTHUR SHELBURNE.

Witnesses:
WILL. H. HAYS,
M. MATTIX.